United States Patent [19]

Greiner

[11] 4,235,518

[45] Nov. 25, 1980

[54] HIGH EFFICIENCY LASER SPECTRUM CONDITIONER

[75] Inventor: Norman R. Greiner, Los Alamos, N. Mex.

[73] Assignee: The United States of America as represented by the United States Department of Energy, Washington, D.C.

[21] Appl. No.: 948,375

[22] Filed: Oct. 4, 1978

[51] Int. Cl.³ .............................................. G02B 5/18
[52] U.S. Cl. ............................ 350/162 R; 331/94.5 C
[58] Field of Search ............................ 350/162 R, 168; 331/94.5 C, 94.5 D; 356/310, 326, 328, 331-334

[56] References Cited

U.S. PATENT DOCUMENTS

| | | | |
|---|---|---|---|
| 2,652,742 | 9/1953 | Walsh | 356/333 X |
| 3,443,243 | 5/1969 | Patel | 350/162 R |
| 3,586,442 | 6/1971 | Tripp | 356/333 X |
| 3,865,490 | 2/1975 | Grossman | 356/333 X |
| 3,907,430 | 9/1975 | Mann | 356/332 |
| 4,009,391 | 2/1977 | Janes et al. | 250/423 P X |

FOREIGN PATENT DOCUMENTS 830573 10/1975 Belgium .
1076393 7/1967 United Kingdom ................ 350/162 R

*Primary Examiner*—F. L. Evans
*Attorney, Agent, or Firm*—James E. Denny; Paul D. Gaetjens; William W. Cochran, II

[57] ABSTRACT

A high efficiency laser spectrum conditioner for generating a collinear parallel output beam containing a predetermined set of frequencies from a multifrequency laser. A diffraction grating and spherical mirror are used in combination, to disperse the various frequencies of the input laser beam and direct these frequencies along various parallel lines spatially separated from one another to an apertured mask. Selection of the desired frequencies is accomplished by placement of apertures at locations on the mask where the desired frequencies intersect the mask. A recollimated parallel output beam with the desired set of frequencies is subsequently generated utilizing a mirror and grating matched and geometrically aligned in the same manner as the input grating and mirror.

2 Claims, 3 Drawing Figures

HIGH EFFICIENCY LASER SPECTRUM CONDITIONER

BACKGROUND OF THE INVENTION

The present invention pertains generally to lasers and more particularly to laser spectrum conditioners.

The quantum nature of gaseous molecular lasers and chemical lasers results in the production of various discrete frequencies in a generated output laser beam. Occasionally, it is desirable to condition this output beam to contain a single or predetermined set of output frequencies. This is of interest in probing various molecular laser gases to look at individual lines to determine if they are competing and also to look at pumping and relaxation aspects of the molecular gas. This is also of interest in the multiphoton process of laser isotope separation by providing a manner of choosing an optimum set of frequencies for operation of the process.

Prior art devices have, however, been designed primarily to select a single frequency signal rather than a set of frequencies. Adaptation of such systems to select a set of frequencies does not provide the desirable collinear parallel beam required in many applications.

SUMMARY OF THE INVENTION

The present invention overcomes the disadvantages and limitations of the prior art by providing a high efficiency laser spectrum conditioner. The present invention provides a means for separating a multifrequency beam into a series of spatially separated single frequency beams. Frequencies not desired in the output beam are masked by blocking selected single frequency beams. Transmitted single frequency beams are subsequently recollimated and rediffracted into a single collinear parallel output beam.

It is therefore an object of the present invention to provide a high efficiency laser spectrum conditioner.

It is also an object of the present invention to provide a device for generating a single parallel collinear beam having a predetermined set of frequencies.

Another object of the present invention is to provide a device for conditioning the spectrum of the laser beam.

Another object of the present invention is to provide a device for eliminating specified frequencies from a multiple frequency laser beam.

Another object of the present invention is to provide a laser spectrum conditioner which can be easily adapted to select a specified set of frequencies.

Another object of the present invention is to provide a laser spectrum conditioner for generating a collinear parallel output beam containing a specified set of frequencies which are dispersed throughout the volume of the beam.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description.

The foregoing Abstract of the Disclosure is for the purpose of providing a nonlegal brief statement to serve as a searching and scanning tool for scientists, engineers and researchers and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
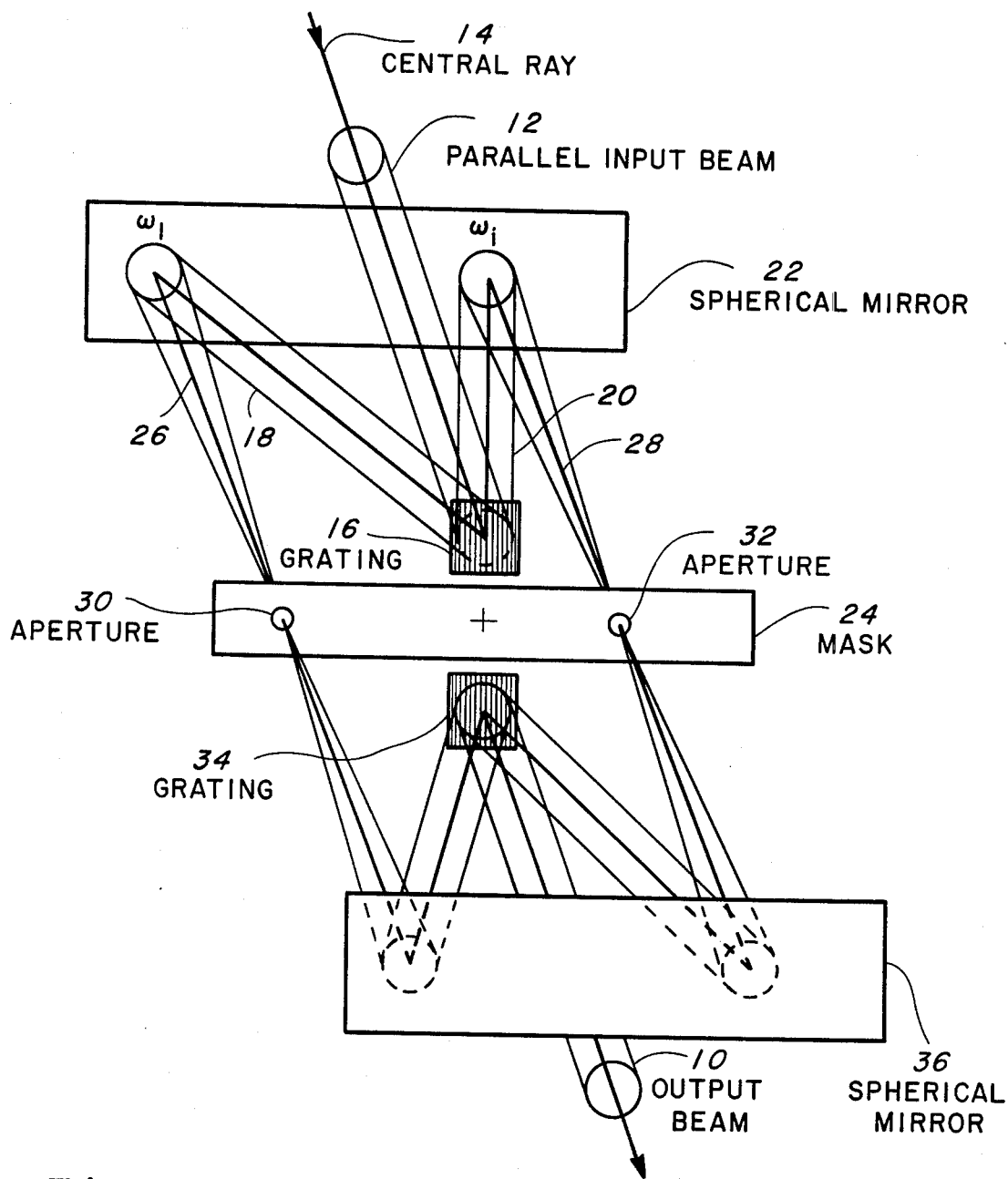
FIG. 1 is a perspective view of the device of the preferred embodiment of the invention.

FIG. 1 is a perspective view illustrating the device of the preferred embodiment of the invention wherein a collinear parallel output beam 10 is produced from a series of input frequencies $\omega_1$ through $\omega_i$. Parallel input beam 12 is a typical laser beam such as that produced by an HF laser which contains a plurality of frequencies $\omega_1$ through $\omega_i$. Central ray 14 traces the path of input beam 12. As shown in FIG. 1, parallel input beam 12 impinges upon grating 16 and is diffracted into a plurality of single frequency beams of which two of these beams, 18 and 20, are shown. Each of the single frequency beams is diffracted by grating 16 to impinge upon spherical mirror 22 at different spatially separated locations. Each specified frequency contained within the parallel input beam generates a separate single frequency beam which is diffracted to a different spatial location. Spherical mirror 22 has its focal point centered on grating 16 such that the single frequency beams diffracted by grating 16 are reflected from spherical mirror 22 along parallel paths to a mask 24. In other words, central rays 26 and 28 are reflected from spherical mirror 22 along parallel paths. Apertures, such as apertures 30 and 32, are formed within the mask 24 to transmit desired single frequency beams. Single frequency beams transmitted through the mask 24 are directed to grating 34 via spherical mirror 36 to form parallel collinear output beam 10. Gratings 16 and 34 are matched and located on a common focal plane so that the output section of the device can be made identical to the input section, to produce an identical output beam containing only the desired frequencies.

Figure 2:
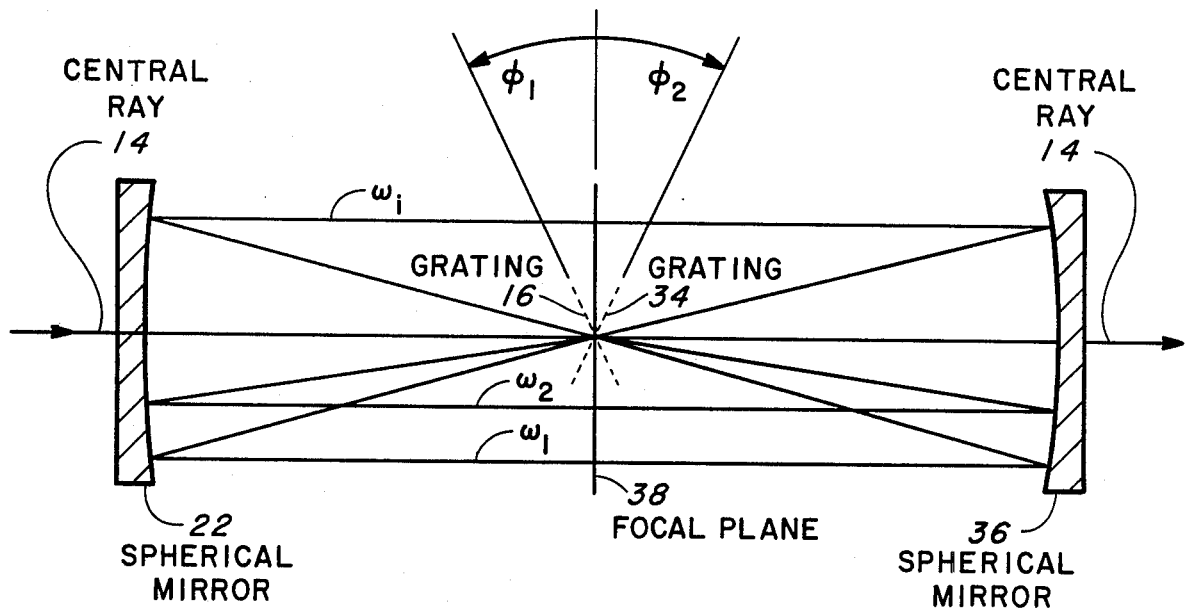
FIG. 2 is a plan view of the device of the preferred embodiment of the invention.

FIG. 2 is a top view of the device of the preferred embodiment illustrating the central rays of three single frequency beams $\omega_1$, $\omega_2$ and $\omega_i$. It should be noted that the gratings 16 and 34 are located on a common focal plane 38 with mask 24. Since gratings 16 and 34 are identical, the angles, $\phi_1$ and $\phi_2$, at which these gratings are disposed with the focal plane 38, are equal.

Figure 3:
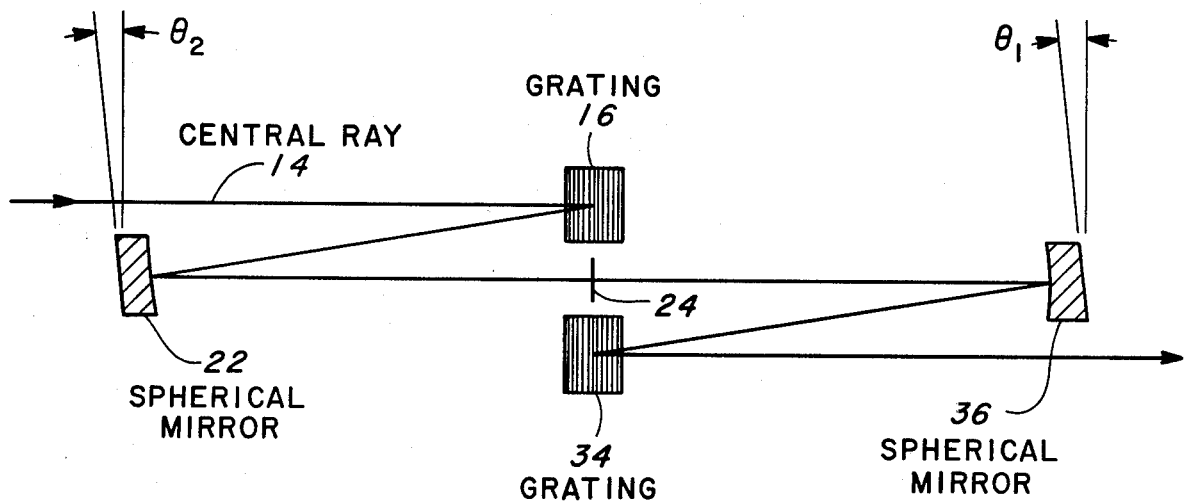
FIG. 3 is a side view of the device of the preferred embodiment of the invention.

FIG. 3 is a side view of the device of the preferred embodiment which clearly illustrates the manner in which the beam is propagated through the device. As shown, central ray 14 is injected through the device above spherical mirror 22 which is tilted to the vertical by an angle $\theta_2$. Diffracted single frequency beams from grating 16 impinge upon spherical mirror 22 and are directed horizontally at mask 24. Likewise, spherical mirror 36 is tilted at an equal angle $\theta_1$ to direct the single frequency masked beam at grating 34. The recollimated output beam subsequently exits the device below spherical mirror 36.

The present invention therefore provides a device which allows conditioning of multiple frequency laser beams of high power density in a very efficient manner.

The symmetry of the device enhances output beam quality and reduces aberrations inherent to any optical system to a minimum. Very large apertures of f/5 or greater can be obtained while providing a means for easily selecting the desired frequencies to be transmitted for recollimation in the output beam.

Obviously many modifications and variations of the present invention are possible in light of the above teachings. For example, even though matching gratings and mirrors are shown which produce symmetry, the same result can be accomplished in a nonsymmetrical manner by nonmatching elements to produce the desired output beam. It is therefore to be understood that within the scope of the appended claims, the invention may be practiced otherwise than as specifically described, and that subject matter disclosed herein and not claimed, shall not be precluded from being later claimed in the present application or in the form of a continuation, continuation-in-part, or reissue application.

What is claimed is:

1. A device for producing a substantially parallel beam of laser radiation having a predetermined set of frequencies comprising:

a first grating disposed at a first predetermined location on a focal plane, said first grating aligned to diffract a multiple frequency laser beam into a plurality of spatially separated single frequency beams;

a first spherical mirror aligned to focus said single frequency beams on a predetermined area of said focal plane;

an apertured mask disposed at said predetermined area of said focal plane, said apertured mask having apertures at preselected points to transmit a preselected set of single frequency beams;

a second spherical mirror aligned to direct said preselected set of single frequency beams to a second predetermined location on said focal plane;

a second grating disposed at said second predetermined location on said focal plane, said second grating aligned to diffract said preselected set of single frequency beams to a substantially parallel output beam having a predetermined set of frequencies;

whereby disposition of said first and second grating on said focal plane allows said single frequency beams to be focused on said predetermined area of said focal plane with central rays of said single frequency beams parallel so as to enhance reconstitution of said substantially parallel output beams.

2. The device of claim 1 wherein said first and second mirrors comprise center sections of spherically shaped mirrors.

* * * * *